United States Patent [19]

Frisch, Jr. et al.

[11] 4,451,627

[45] May 29, 1984

[54] ADDITION POLYMERIZABLE URETHANE-BASED ANAEROBIC ADHESIVES MADE FROM TIN (II) ORGANOESTERS

[75] Inventors: Kurt C. Frisch, Jr.; Michele R. Lock, both of Midland City; Gregory J. Stuk, Ann Arbor, all of Mich.

[73] Assignee: The Dow Chemical Company, Midland, Mich.

[21] Appl. No.: 415,076

[22] Filed: Sep. 7, 1982

[51] Int. Cl.$^3$ .............................................. C08F 4/06
[52] U.S. Cl. .................................. 526/192; 156/331.1; 156/331.4; 528/49; 528/69; 528/75; 526/301; 526/302
[58] Field of Search ..................... 156/331.1, 331.4; 528/49, 69, 75; 526/192, 301, 302

[56] References Cited

U.S. PATENT DOCUMENTS

| 3,425,988 | 2/1969 | Gorman et al. | 526/230 |
| 4,233,425 | 11/1980 | Tefertiller et al. | 204/159.15 |
| 4,320,221 | 3/1982 | Hoffman | 156/306.3 |
| 4,374,969 | 2/1983 | Frisch | 528/69 |

*Primary Examiner*—Maurice J. Welsh
*Attorney, Agent, or Firm*—Jeffrey S. Boone

[57] ABSTRACT

An addition polymerizable adhesive is prepared by using the reaction product of (1) an isocyanate compound (such as 2-isocyanatoethyl methacrylate) and (2) an active hydrogen compound (such as a poly(ethylene glycol)) wherein the reaction between (1) and (2) is catalyzed with a tin (II) organoester (such as stannous octoate). The adhesives of the invention have surprisingly long shelf lives compared to similar adhesives made with other catalysts.

14 Claims, No Drawings

ADDITION POLYMERIZABLE URETHANE-BASED ANAEROBIC ADHESIVES MADE FROM TIN (II) ORGANOESTERS

BACKGROUND OF THE INVENTION

The instant invention relates to formulations useful as anaerobic adhesives.

Anaerobic adhesives are well known and have been in commercial use for several years. Most anaerobic adhesives are compositions containing a monomer, or combination of monomers, which will polymerize under certain conditions but not under other conditions. Those conditions generally favoring polymerization include the absence of oxygen and, if a redox initiator is used, the presence of metal ions. Oxygen acts as a polymerization inhibitor, and metal ions act as polymerization promoters.

Consequently, these adhesives find optimal use in situations where they are pressed tightly between two metal surfaces, such as between the threads of a bolt and nut. The close fit effectively removes oxygen, and the metal surface provides metal ions. This combination of conditions causes the adhesive to polymerize, and a strong bond results.

While a significant breakthrough in the technology of anaerobic adhesives was made through the introduction of urethane bonds as described in U.S. Pat. No. 3,425,988 (1969), this technology is limited to reacting monofunctional alkyl and aryl acrylate esters containing hydroxy and amino functional groups with polyisocyanates. In some instances, it is desirable to include polyfunctional compounds such as polyglycols, bisphenols and polyamines, in addition to the monofunctional alkyl and aryl acrylate esters. These polyfunctional compounds serve two major functions: (1) to modify the physical properties of the resin and (2) to remove the unreacted and toxic excesses of isocyanate compounds. The isocyanate compounds are used in excess to reduce the amount of volatile and toxic monofunctional alkyl or aryl acrylate esters. Because of the tendency for polyisocyanates and polyactive hydrogen compounds to form network polymers (gel), the stoichiometry of the preceding reactions is limited.

A further breakthrough was disclosed in U.S. Pat. No. 4,320,221 (1982). Here, the anaerobic adhesives employ the reaction product of an addition polymerizable monoisocyanate with a polyfunctional active hydrogen compound. While these materials have many advantages over those taught by the aforementioned U.S. Pat. No. 3.425,988, most of these formulations suffer from poor shelf life.

U.S. Pat. application Ser. No. 364,830, filed Apr. 2, 1982, teaches that long shelf life may be obtained through the use of a polyamine and the absence of a urethane catalyst. However, the use of polyamines is not always desirable (e.g., because of cost), and it may be desirable to catalyze the urethane reaction even if an amine is used.

In view of the aforementioned deficiencies of conventional anaerobic adhesives, it is very desirable to provide an anaerobic adhesive that possesses all of the stoichiometric and physical performance advantages of the recently developed polyurethane adhesives but does not have the shelf life limitations of such adhesives.

SUMMARY OF THE INVENTION

In one aspect, the present invention is an anaerobic adhesive comprising (1) the reaction product of an isocyanate compound and an active hydrogen compound wherein one of either the isocyanate or active hydrogen compounds has an addition polymerizable double bond and the other is polyfunctional, or both the isocyanate and active hydrogen compounds have addition polymerizable double bonds, said reaction product having been formed in the presence of a catalytic amount of a tin (II) organoester; (2) a curing amount of a polymerization initiator; and (3) a stabilizing amount of a polymerization inhibitor.

The adhesives of the invention have surprisingly long shelf lives compared to similar adhesives made with other catalysts.

DETAILED DESCRIPTION OF THE INVENTION

As one component, the adhesive of this invention requires the reaction product of an isocyanate and an active hydrogen compound, wherein one of either the isocyanate or active hydrogen compounds has an addition polymerizable double bond and the other is polyfunctional, or both the isocyanate and active hydrogen compounds have addition polymerizable double bonds. In making the reaction product, the reaction between the isocyanate and active hydrogen compounds is catalyzed with a tin (II) organoester. Active hydrogen compounds are those which display significant activity according to the Zerewitinoff test described by Woller in the *Journal of American Chemical Society*, Vol. 49, page 3181 (1927). Specifically included within the definition of active hydrogen compounds are alcohols, amines, amides, mercaptans and acids. Also specifically included are compounds having an —SeH or —TeH group. This reaction product is then blended with other suitable components, including, but not limited to, an initiator and inhibitor.

The practice of the invention requires the use of a tin (II) organoester according to the formula $$R^1-\overset{O}{\underset{\|}{C}}-O-Sn-O-\overset{O}{\underset{\|}{C}}-R^2$$

wherein $R^1$ and $R^2$ each separately denote a hydrogen or an organic radical. In a preferred embodiment, $R^1$ and $R^2$ each separately denote a $C_1$ to $C_{25}$ organic radical. In a more preferred embodiment, $R^1$ and $R^2$ are acyclic aliphatic $C_1$ to $C_{25}$ organic radicals. In a still more preferred embodiment, $R^1$ and $R^2$ each separately denote a $C_5$ to $C_{20}$ acyclic aliphatic organic radical. In an even more preferred embodiment, $R^1$ and $R^2$ both denote radicals according to the formula:

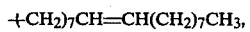

(stannous oleate). In a most preferred embodiment, $R^1$ and $R^2$ both denote radicals according to the formula:

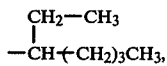

(stannous octoate).

The above-described tin catalyst is added to the isocyanate and active hydrogen compounds in an amount and in a manner similar to the use of any urethane catalyst. Its ability to catalyze the urethane reaction is similar to that of similar catalysts. It is their effect on the shelf life of the formulated adhesive which is quite different.

The catalyst is added in an amount sufficient to promote the reaction of the isocyanate with the active hydrogen. The actual amount may vary over a wide range, but is generally present at desirably about 0.01 to about 1.0 percent, more desirably about 0.05 to about 0.5 percent and preferably about 0.1 to about 0.3 percent, by weight, based on the combined weight of the isocyanate and active hydrogen compounds.

In one embodiment, an addition polymerizable isocyanate is reacted with an addition polymerizable active hydrogen compound. For instance, 2-isocyanatoethyl methacrylate (other suitable isocyanates are listed hereinafter) may be reacted with vinyl benzyl alcohol, 2-hydroxyethyl acrylate, 2-hydroxyethyl methacrylate, etc. In another embodiment, one of the above-listed addition polymerizable active hydrogen compounds is reacted with a polyfunctional isocyanate such as toluene diisocyanate. In an especially preferred embodiment, an addition polymerizable isocyanate is reacted with a polyfunctional active hydrogen compound generally in accordance with the teachings of U.S. Pat. No. 4,320,221.

In this preferred embodiment, suitable isocyanates include any addition polymerizable monoisocyanates. Examples include vinyl isocyanate and vinylbenzyl isocyanate. More desirable monomers include isocyanatoalkyl esters of α,β-ethylenically unsaturated carboxylic acids. Preferred are isocyanato esters of the formula:

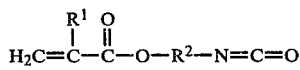

wherein $R^1$ is a hydrogen or an organic radical of from 1 to 5 carbon atoms and $R^2$ is a carbon chain of desirably from 1 to 7 carbon atoms, preferably from 2 to 6 carbon atoms. More preferred is 2-isocyanatoethyl acrylate. Most preferred is 2-isocyanatoethyl methacrylate (IEM).

In this preferred embodiment the addition polymerizable isocyanate is reacted with a "polyahl." The term "polyahl" generally includes any polyfunctional compounds having an average greater than 1 active hydrogen moiety. Suitable compounds may be those with active hydrogens supplied from only one or from more than one type of active hydrogen moiety. Examples of compounds having more than one type of active hydrogen include amino alcohols and mercapto alcohols. Importantly, suitable polyahls also specifically include those compounds having 3 or more active hydrogen moieties per molecule.

Examples of amines which are suitable polyahls for use in the instant invention include ethylenediamine, 1,2- and 1,3-diaminopropane, 1,7-diaminohexane, monoethanolamine, diethanolamine, diaminobenzene, diaminotoluene and the like.

Examples of polyols are the polyol polyethers, the polyol polyesters, hydroxy functional acrylic polymers, hydroxyl-containing epoxy resins, polyhydroxy terminated polyurethane polymers, polyhydroxyl-containing phosphorus compounds and alkylene oxide adducts of polyhydric thioethers including polythioethers, acetals including polyacetals, aliphatic and aromatic polyols and thiols including polythiols, ammonia and amines including aromatic, aliphatic and heterocyclic amines including polyamines as well as mixtures thereof. Alkylene oxide adducts of compounds which contain two or more different groups within the above-defined classes may also be used, such as amino alcohols which contain an amino group and a hydroxyl group. Also alkylene oxide adducts of compounds which contain one —SH group and one —OH group as well as those which contain an amino group and a —SH group may be used.

Polyether polyols which are most advantageously employed as the polyahl in the practice of this invention are the polyalkylene polyether polyols including the polymerization products of alkylene oxides and other oxiranes with water or polyhydric alcohols having from two to eight hydroxyl groups. Exemplary alcohols that are advantageously employed in making the polyether polyol include ethylene glycol, 1,3-propylene glycol, 1,2-propylene glycol, 1,4-butylene glycol, 1,3-butylene glycol, 1,2-butylene glycol; 1,5-pentane diol, 1,7-heptane diol, glycerol, 1,1,1-trimethylolpropane, 1,1,1-trimethylolethane, hexane-1,2,6-triol, alphamethyl glucoside, pentaerythritol, erythritol, pentatols and hexatols. Also included within the term "polyhydric alcohol" are sugars such as glucose, sucrose, fructose and maltose as well as compounds derived from phenols such as 2,2-(4,4'-hydroxylphenyl)-propane, commonly known as bisphenol A, and bisphenol F. Also included are alkylene oxide derivatives of bisphenol A, bisphenol F, etc., and hydrolyzed derivatives of epoxy resins such as hydrolyzed D.E.R. ® 331 (available from The Dow Chemical Company).

Illustrative oxiranes that are advantageously employed in the preparation of the polyether polyol include simple alkylene oxides such as ethylene oxide, propylene oxide, butylene oxide and amylene oxide; glycidyl ethers such as t-butyl glycidyl ether and phenyl glycidyl ether and random or block copolymers of two or more of these oxiranes. The polyalkylene polyether polyols may be prepared from other starting materials such as tetrahydrofuran and alkylene oxide-tetrahydrofuran copolymers; epihalohydrins such as epichlorohydrin; as well as aralkylene oxides such as styrene oxide. The polyalkylene polyether polyols may have primary, secondary or tertiary hydroxyl groups and, preferably, are polyethers prepared from alkylene oxides having from two to six carbon atoms such as ethylene oxide, propylene oxide and butylene oxide. The polyalkylene polyether polyols may be prepared by any known process such as, for example, the process disclosed by Wirtz in 1859 and *Encyclopedia of Chemical Technology*, Vol. 7, pp. 257–262, published by Interscience Publishers, Inc. (1951) or in U.S. Pat. No. 1,922,459. Also suitable are polyether polyols and processes for preparing them that are described in Schick, M. J., *Nonionic Surfactants*, Marcel Dekker, Inc., New York (1967), U.S. Pat. Nos. 2,891,073; 3,058,921; 2,871,219 and British Pat. No. 898,306. Polyether polyols which are most preferred include the alkylene oxide addition products of water, trimethylolpropane, glycerine, pentaerythritol, sucrose, sorbitol, propylene glycol and blends thereof having hydroxyl equivalent weights up to about 5,000.

Polyhydric thioethers which are sometimes advantageously condensed with alkylene oxides include the reaction product of thiodiglycol with alkylene oxides or dihydric alcohol such as disclosed above for the preparation of the hydroxyl-containing polyethers with any other suitable thioether glycol.

Polyhydroxyl-containing phosphorus compounds which are optionally used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Polyacetals (acetal resins) which are optionally reacted with alkylene oxides or other oxiranes include the reaction product of formaldehyde or other suitable aldehyde with a polyhydric alcohol or an oxirane such as those disclosed above. Polyacetals derived from acetone or from cyclic acetals are also suitably employed.

Aliphatic and aromatic thiols which are optionally reacted with alkylene oxides and other oxiranes include alkane thiols such as 1,2-ethane dithiol, 1,2-propane dithiol and 1,6-hexane dithiol; alkene thiols such as 2-butene-1,4-dithiol and alkyne thiols such as 3-hexyne-1,6-dithiol and arene thiols such as 1,4-benzene dithiol. Other thiols suitable for this purpose are hydrogen sulfide as well as thio functional polymers such as polyvinylbenzyl thiol.

Acids and amides which are optionally reacted with alkylene oxides and other oxiranes include difunctional fatty acids such as hydroxystearic and dihydroxystearic acid as well as amides such as fatty acid alkanol amides, e.g., lauroyl monoethanolamide; diacids such as adipic and terephthalic acid; sulfonamides and other acids and amides set forth in Schick, supra.

Amines which are optionally reacted with alkylene oxides and other oxiranes include aromatic amines such as aniline, o-chloroaniline, p-amino aniline, 1,5-diamino naphthalene, methylene dianiline, the condensation products of aniline and formaldehyde and 2,4-diaminotoluene; aliphatic amines such as methylamine, triisopropanolamine, isopropanolamine, diisopropanolamine, ethylenediamine, 1,3-propylenediamine, 1,4-butylenediamine and 1,3-butylenediamine, mixtures thereof and the like.

Additional polyethers and methods for their preparation are set forth in Schick, supra.

Examples of suitable hydroxy-containing polyesters include those obtained from polycarboxylic acids and polyhydric alcohols. Examples of suitable polycarboxylic acids include oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, alpha-hydromuconic acid, beta-hydromuconic acid, alpha-butyl-alpha-ethyl-glutaric acid, alpha, beta-diethylsuccinic acid, phthalic acid, isophthalic acid, terephthalic acid, hemimellitic acid and 1,4-cyclohexane-dicarboxylic acid. Any suitable polyhydric alcohol including both aliphatic and aromatic may be used such as ethylene glycol, 1,3-propylene glycol, 1,2-propylene glycol, 1,4-butylene glycol, 1,3-butylene glycol, 1,2-butylene glycol, 1,5-pentane diol, 1,4-pentane diol, 1,3-pentane diol, 1,6-hexane diol, 1,7-heptane diol, glycerol, 1,1,1-trimethylolpropane, 1,1,1-trimethylolethane, hexane-1,2,6-triol, alpha-methyl glycoside, pentaerythritol and sorbitol. Also included within the term "polyhydric alcohol" are compounds derived from phenols such as 2,2(4,4'-hydroxyphenyl)propane, commonly known as bisphenol A.

Other polyahls suitably employed include polylactones, hydroxy functional acrylic polymers such as polymers of hydroxyethyl acrylate and hydroxypropyl acrylate, polyvinyl acetate and other polymers of vinyl acetate and other ethylenically unsaturated carboxylic acids, hydroxyl-containing epoxy resins, urea-formaldehyde and melamine-formaldehyde resins, hydroxyl-containing polycarbonates and polyurethanes, methylol resins, starches and other cellulosic polymers, esters of phosphoric, sulfonic, sulfuric and boric acid and polypeptides.

Additional polyols include glycols such as ethylene glycol, 1,2-propylene glycol, 1,3-propylene glycol, 1,4-butylene glycol, 1,3-butylene glycol, 1,2-butylene glycol and the like, glycerine, 1,1,1-trimethylolpropane, pentaerythritol and the like.

Polymercaptans include hydrogen sulfide, 1,2-dimercaptoethane, 1,3-dimercaptopropane, low and high molecular weight Thiokol ® polysulfide elastomers and the like.

Polyphenols include bisphenol A, bisphenol F, dihydroxybiphenyls, and the like.

Polyacids include adipic acid, sebaccic acid, terephthalic acid and the like.

Other polyahls include compounds having mixed functionalities such as 2-mercaptoethanol, 2-aminoethanol, mercaptophenol and the like.

Of the above classes of polyahls; polyols, and polymercaptans are preferred. Polyols are particularly available and safe to handle, as well as easy to use. Glycols and glycol ethers are readily used in the invention.

In formulating an adhesive according to the invention, the isocyanate and active hydrogen compound should be reacted in a ratio such that the reactant is capable of being addition polymerized to a substantially solid material. Since suitable polyahls specifically include those compounds having 3 or more active hydrogen moieties per molecule, in defining reaction ratios it is important to specify whether equivalent ratios or molecular ratios are being used. It is generally desirable, from a toxicological standpoint, to have a slight excess of active hydrogen moiety. From an adhesive performance standpoint, it is desirable to have at least 1 molecule of isocyanate for each molecule of polyahl. An excess of isocyanate is not unduly harmful to the adhesive properties. Preferably, there should be about one equivalent of isocyanate for each equivalent of active hydrogen.

To be useful as an anaerobic adhesive, the isocyanate-active hydrogen reaction product requires a free radical generating means capable of initiating addition polymerization of the reaction product. Any free radical generating means such as a peroxygen compound or an azo compound which is suitably employed in the addition polymerization of ethylenically unsaturated monomers is suitably employed in the practice of this invention. Examples of such free radical generating means and conditions of use are set forth in U.S. Pat. No. 3,043,820. Preferred free radical generating means include peroxygen compounds such as hydrogen peroxide and the entire class of organic peroxides and hydroperoxides such as cumene hydroperoxide and t-butyl hydroperoxide. Such initiators or other free radical generating means are employed in a curing amount, that is, an amount sufficient to cause the desired polymerization of the reaction product. In the case of the hydroperoxides, such are preferably employed in amounts as low as 0.01 weight percent based on the weight of the reaction product, more preferably from about 1 to about 10 weight percent.

Although not required, it is often preferable to employ an accelerator in combination with the initiator. Accelerators are compounds which are believed to increase the rate of initiator breakdown. Typical accelerators include tertiary amines such as N,N'-dimethylaniline; N,N'-dimethyl-p-toluidene; triethylamine; and imides such as benzoic sulfimide. Such accelerators may be used in quantities of 0.01 to 15 percent by weight based on the weight of initiator, with 0.1 to 7 percent being preferred.

Metal ions are particularly effective and useful accelerators. While metal ions may be specifically added to the composition, a trace amount will possibly be present as an impurity. In any event, if the adhesive is applied to a metal substrate, the substrate will provide the metal ion source. The application of the adhesive to a metal is particularly advantageous in that it delays the presence of an accelerator until the adhesive is actually being used. Examples of effective metal ions include $Cu^+$, $Fe^{++}$, $Cr^{++}$ and $V^{++}$. The metal ions need be present only in catalytic (trace) amounts. For example, 1 ppm of metal ions will usually be effective.

Because the aforementioned initiators or combination of initiator and accelerators promote polymerization quite well, it is generally required to employ an inhibitor to prevent premature polymerization. Examples of such inhibitors are antioxidants including phenols such as 2,6-di-tert-butyl-4-methylphenol (Ionol ®), quinones such as benzoquinone, hydroquinones and other compounds that are known to inhibit addition polymerization of ethylenically unsaturated monomers. An effective amount of an inhibitor must be added to a useful adhesive formulation. An "effective amount" of an inhibitor is an amount which will prevent premature polymerization of the formulation. Excess inhibitor will cause long cure times. Preferably, the inhibitor is a quinone or a hydroquinone which is preferably employed in an amount in the range from about 5 to 10,000 ppm based on the formulation weight, more preferably from about 50 to about 1,000 ppm.

While a free-radical initiator and inhibitor are, in practical terms, requirements, the other components of the initiator system are optional. Some applications will need none or only some of the other ingredients.

The adhesive of the instant invention is utilizable in a number of applications. Uses include adhesives and metal impregnation. Specific applications include locking threaded assemblies, sealing threaded, porous and flanged assemblies, strengthening cylindrical assemblies and structural bonding. Substrates to be bonded include metals, plastics, ceramics and glass. Potential medical applications include tooth and bone cementing sealants.

In applications such as locking the threads of steel bolts and nuts, the oxygen which is present in the adhesive is quickly consumed by the initiator and the physical barrier of the threads prevents the infusion of new oxygen. In other applications or in particular formulations, however, it may be desirable to specifically remove the oxygen from the system. Such removal may be by mechanical means such as a vacuum pump or by chemical means such as an oxygen consuming agent.

Further details of the invention will become apparent in the following examples. In the examples, all parts and percentages are by weight, unless otherwise specified.

EXAMPLE I

To a 250 ml, 3-neck, round-bottom flask equipped with an addition funnel, stirrer, thermocouple, and condenser are added 2-hydroxyethyl methacrylate (45.50 g, 0.35 mole), Ionol ® antioxidant (0.05 g, available from Shell Chemical Company, Houston, TX, USA; believed to be 2,6-di-tert-butyl-4-methyl-phenol), and stannous octoate (0.19 g, sold as T-9 by M&T Chemical, Rahway, NJ, USA). 2-isocyanatoethyl methacrylate (54.31 g, 0.35 mole, sold as XAS-10743.00 by The Dow Chemical Company, Midland, MI, USA) is added dropwise over a period of 10 minutes. An ice water bath is applied as needed to prevent the reaction temperature from exceeding 55° C. Another portion of stannous octoate (0.09 g) is added upon completion of addition of the isocyanate. The temperature of the reaction mixture is then maintained at 55° C. for 3 hours. Infrared spectroscopy indicates that all of the isocyanate has reacted. The product, a slightly viscous, clear liquid is allowed to cool and is then formulated with cumene hydroperoxide (2 percent). No accelerator or inhibitor (except for the Ionol ® used during the preparation of the adduct) is used.

Shelf stability is measured by placing a sample in a test tube, placing the test tube in an 82° C. water bath, and placing a glass rod, which is attached to the shaft of a torque-measuring motor, into the sample. The rod is rotated at 11 rpm and the torque measured. Results are reported as the time (in minutes) until the torque sharply increases due to increasing viscosity caused by polymerization of the mixture. Longer times to viscosity increase represent greater shelf life stability.

The above procedure is repeated several times, substituting for the catalyst, a mixture of stannous octoate in dioctyl phthalate (T-10, available from Witco Chemical, New York, NY, USA), lead octoate, zinc octoate, dibutyl tin dilaurate, dibutyl tin diacetate, UL 1 (a tin (IV) complex, available from Witco Chemical, New York, NY, USA, of unknown composition), UL 28 (a tin (IV) complex, available from Witco Chemical, New York, NY, USA, of unknown composition but believed to be substantially equivalent to dimethyl tin dilaurate), triethylene diamine and no catalyst.

The results are shown in Table I and illustrate the improved results obtained with stannous octoate.

TABLE I

| Sample | Catalyst | Metal | Oxidation Number | Time (min) |
| --- | --- | --- | --- | --- |
| 1-1 | stannous octoate | Sn | II | 9.3 |
| 1-2 | stannous octoate/ dioctyl phthalate (T-10) | Sn | II | 9.5 |
| 1-3* | lead octoate | Pb | II | 1.7 |
| 1-4* | zinc octoate | Zn | II | 2.3 |
| 1-5* | dibutyl tin dilaurate | Sn | IV | 1.4 |
| 1-6* | dibutyl tin diacetate | Sn | IV | 1.8 |
| 1-7* | UL-1 | Sn | IV | 3.4 |
| 1-8* | UL-28 | Sn | IV | 2.4 |
| 1-9* | triethylene diamine | — | — | 8.3 |
| 1-10* | none | — | — | 8.3 |

*Not an example of the invention.

EXAMPLE II

To a 250 ml, 3-neck flask equipped with an addition funnel, mechanical stirrer, and condenser with a drying tube, are added 38.85 g (0.2 mole) of tetraethylene glycol (TEG), 0.05 g of Ionol ® antioxidant, and 0.163 g of stannous octoate. 62.68 g (0.4 mole) of IEM is added dropwise over about 3 hours, such that the temperature of the reaction mixture is maintained at about 40° to 55° C. No external heat source is used. One hour after the addition of IEM is complete, infrared spectroscopy showing diminished absorption at 2275 cm$^{-1}$ indicates that 85 to 90 percent of the IEM has reacted. After allowing the mixture to sit overnight at room temperature, there is no absorption at 2275 cm$-1$, indicating that all of the IEM has reacted.

Using the apparatus described in Example 1, the shelf stability of the IEM-TEG adduct is measured. The time to gelation is determined by examining the trace of a chart recorder which shows torque vs. time, and measuring the time required for the slope of the curve to go from zero to a positive value.

In a similar manner, adducts are prepared using as catalysts, stannous oleate, stannous oxalate, stannous ethylene glycoxide, stannous chloride, dibutyl tin dilaurate, dibutyl tin diacetate, dibutyl tin dichloride, and no catalyst. The results are reported in Table II and show the superior performance of tin (II) organoesters of the formula:

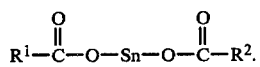

TABLE II

| Sample | Catalyst | Metal | Oxidation Number | Time (min) |
|---|---|---|---|---|
| 2-1 | stannous octoate | Sn | II | 51.6 |
| 2-2 | stannous oleate | Sn | II | 41.3 |
| 2-3* | stannous oxalate | Sn | II | 6.7 |
| 2-4* | stannous ethylene glycoxide | Sn | II | 8.0 |
| 2-5* | stannous chloride | Sn | IV | 12.9 |
| 2-6* | dibutyl tin dilaurate | Sn | IV | 7.1 |
| 2-7* | dibutyl tin diacetate | Sn | IV | 6.0 |
| 2-8* | dibutyl tin dichloride | Sn | IV | 15.1 |
| 2-9* | none | — | — | 53.0 |

*Not an example of the invention.

What is claimed is:

1. An adhesive comprising
   a. the reaction product of (1) an isocyanate compound, and (2) an active hydrogen compound, wherein one of (1) or (2) has an addition polymerizable double bond, and the other is polyfunctional, or both (1) and (2) have addition polymerizable double bonds, said reaction product having been formed in the presence of a catalytic amount of a tin (II) organoester according to the formula

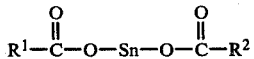

wherein $R^1$ and $R^2$ each separately denote a hydrogen or an organic radical;
   b. a curing amount of a polymerization initiator; and
   c. a stabilizing amount of a polymerization inhibitor.

2. The adhesive of claim 1 wherein the isocyanate compound is a diisocyanate which does not have an addition polymerizable double bond, and the active hydrogen compound is a hydroxyalkyl ester of an addition polymerizable carboxylic acid.

3. The adhesive of claim 1 wherein the isocyanate compound is an isocyanatoalkyl ester of an addition polymerizable carboxylic acid, and the active hydrogen compound is a polyahl.

4. The adhesive of claim 3 wherein the polyahl is a polyol.

5. The adhesive of claim 4 wherein the polyol is a poly(alkylene ether)diol.

6. The adhesive of claim 3 wherein the ethylenically unsaturated isocyanate has the formula:

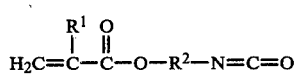

wherein $R^1$ is a hydrogen or a carbon chain of from 1 to 5 carbon atoms and $R^2$ is a carbon chain of from 1 to 7 carbon atoms.

7. The adhesive of claim 6 wherein the ethylenically unsaturated isocyanate is 2-isocyanatoethyl methacrylate or 2-isocyanatoethyl acrylate.

8. The adhesive of claim 1 or 6 wherein in the tin (II) organoester, $R^1$ and $R^2$ each separately denote a $C_1$ to $C_{29}$ organic radical.

9. The adhesive of claim 1 or 6 wherein in the tin (II) organoester, $R^1$ and $R^2$ each separately denote a $C_1$ to $C_{25}$ acyclic aliphatic organic radical.

10. The adhesive of claim 1 or 6 wherein in the tin (II) organoester, $R^1$ and $R^2$ each separately denote a $C_5$ to $C_{20}$ acyclic aliphatic organic radical.

11. The adhesive of claim 10 wherein $R^1$ and $R^2$ both denote radicals according to the formula:

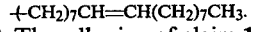

12. The adhesive of claim 10 wherein $R^1$ and $R^2$ both denote radicals according to the formula:

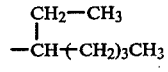

13. A method of bonding comprising placing an adhering quantity of the adhesive of claim 1, 7 or 10 between two surfaces.

14. The product produced by the method of claim 13.

* * * * *